US008477747B1

(12) United States Patent
Sobel et al.

(10) Patent No.: US 8,477,747 B1
(45) Date of Patent: Jul. 2, 2013

(54) AUTOMATIC CAPTURE OF WIRELESS ENDPOINTS FOR CONNECTION ENFORCEMENT

(75) Inventors: William E. Sobel, Jamul, CA (US); Brian Hernacki, Mountain View, CA (US)

(73) Assignee: Symantec Corporation, Mountain View, CA (US)

( * ) Notice: Subject to any disclaimer, the term of this patent is extended or adjusted under 35 U.S.C. 154(b) by 727 days.

(21) Appl. No.: 12/343,363

(22) Filed: Dec. 23, 2008

(51) Int. Cl.
*H04W 4/00* (2009.01)

(52) U.S. Cl.
USPC ........... 370/338; 370/401; 370/462; 455/411; 726/4; 726/17; 726/21; 726/28; 726/29

(58) Field of Classification Search
USPC ........... 370/328, 329, 338, 461, 561; 455/411
See application file for complete search history.

(56) References Cited

U.S. PATENT DOCUMENTS

| 5,724,346 A * | 3/1998 | Kobayashi et al. ........... 370/329 |
| 8,152,074 B1 * | 4/2012 | de Jong ......................... 235/492 |
| 2003/0200455 A1 * | 10/2003 | Wu ................................ 713/200 |
| 2008/0167003 A1 * | 7/2008 | Wang et al. .................... 455/411 |

\* cited by examiner

*Primary Examiner* — Alvin Zhu
(74) *Attorney, Agent, or Firm* — Brill Law Office; Jeffrey Brill

(57) ABSTRACT

Wireless endpoints to be secured in a wireless network context are automatically identified. More specifically, wireless endpoints connecting to a wireless access point are detected. It is determined whether detected endpoints are connecting to the wireless access point to join a wireless network. Wireless access points determined to be connecting to the wireless access point to join a wireless network are automatically identified as endpoints to be managed. Identifying information concerning endpoints to be managed (e.g., MAC addresses) is gleaned, and automatically provided to an endpoint management system.

19 Claims, 2 Drawing Sheets

AUTOMATIC CAPTURE OF WIRELESS ENDPOINTS FOR CONNECTION ENFORCEMENT

TECHNICAL FIELD

This invention pertains generally to wireless network security, and more specifically to automatically identifying wireless endpoints to be secured.

BACKGROUND

Wireless networks are widely used today. Wireless technology provides many advantages over wired networks. However, while it is easy to prevent wired network users from joining external wired networks without permission, it is difficult to prevent unauthorized access of external wireless networks by wireless network users. More specifically, it is easy for an unauthorized wireless network user such as a child or employee to reconfigure a computer (e.g., their laptop) to join a nearby (uncontrolled) wireless network (e.g., one set up by a neighbor). By joining an external uncontrolled wireless network, a managed user such as a child or employee can easily circumvent network controls that are in place on their local network, such as a parental control system or company access restrictions.

Methodology is known that enables an agent to prevent specific computing devices (endpoints) from joining non-approved wireless networks. If the agent is provided with a list of endpoints to control, it can apply appropriate security precautions to the listed endpoints. What the known methodology lacks is the ability to easily identify such endpoints in a quick and seamless way. It would be desirable address this issue.

SUMMARY

Wireless endpoints to be secured in a wireless network context are automatically identified. More specifically, wireless endpoints connecting to a wireless access point are detected. It is determined whether detected endpoints are connecting to the wireless access point to join a wireless network. Wireless end points determined to be connecting to the wireless access point to join a wireless network are automatically identified as endpoints to be managed. Identifying information concerning endpoints to be managed (e.g., MAC addresses) is gleaned, and automatically provided to an endpoint management system.

The features and advantages described in this summary and in the following detailed description are not all-inclusive, and particularly, many additional features and advantages will be apparent to one of ordinary skill in the relevant art in view of the drawings, specification, and claims hereof. Moreover, it should be noted that the language used in the specification has been principally selected for readability and instructional purposes, and may not have been selected to delineate or circumscribe the inventive subject matter, resort to the claims being necessary to determine such inventive subject matter.

The Figures depict embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

Figure 1:
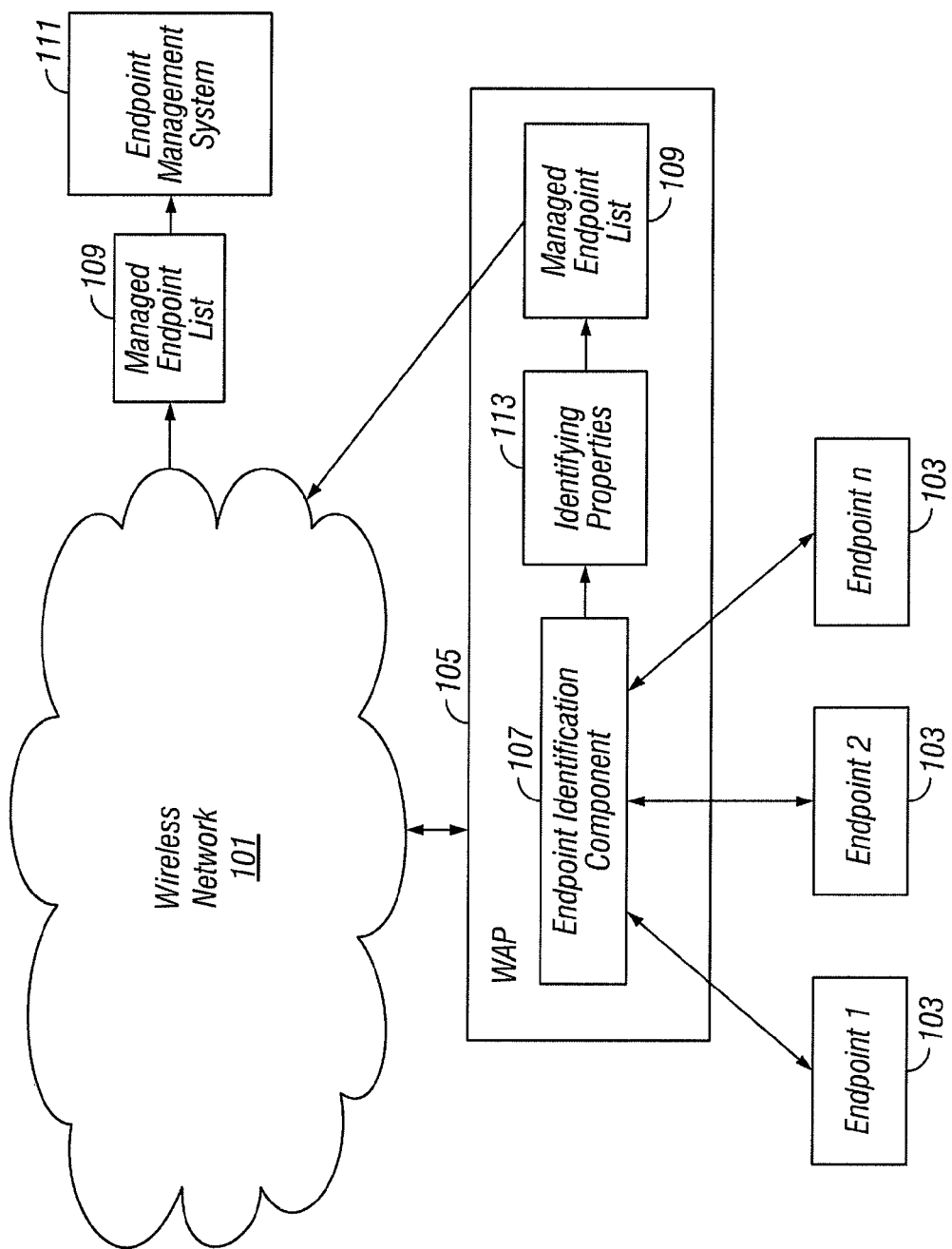
FIG. 1 is a block diagram illustrating a system for automatically identifying wireless endpoints to be secured, according to some embodiments of the present invention.

FIG. 1 illustrates a system for automatically identifying endpoints 103 to be secured, according to some embodiments of the present invention. It is to be understood that although various components are illustrated in FIG. 1 as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

To join a wireless network 101, an endpoint 103 connects to a wireless access point 105 (WAP). A WAP 105 is a device that allows computing devices configured for wireless communication (endpoints 103) to connect to a wireless network 101. A WAP 105 can but need not contain other network device(s), such as a router and/or an Ethernet switch. Endpoints 101 typically connect to WAPs 105 in one of two ways. One way is via a physical connection, in which, for example, a user presses a button on the WAP 105 and another button on the endpoint 103. The second method is for the user to enter a passphrase to connect to the wireless network 101. Passphrases are utilized under wireless network 101 security protocols such as Wired Equivalent Privacy (WEP) and Wi-Fi Protected Access (WPA and WPA2).

As illustrated in FIG. 1, an endpoint identification component 107 detects when endpoints 103 connect to a WAP 105. Responsive to detecting a new endpoint 103 connecting to a WAP 105 to join a wireless network 101 (i.e., the endpoint 103 is connecting to the WAP 105 for the first time), the endpoint identification component 107 automatically identifies the endpoint 103 as one to be managed. The endpoint identification component 107 can automatically add the identified endpoint 103 to a managed endpoints list 109, for use by an endpoint management system 111, as discussed below.

The endpoint identification component 107 is illustrated as executing on the WAP 105. It is to be understood that the endpoint identification component 107 can be instantiated as software, hardware and/or firmware at the WAP 105, but can also be in the form of a management program coupled to the WAP 105 via a management interface on, e.g., a parent's or network administrator's computing device (not illustrated). Regardless of the specific implementation utilized, the endpoint identification component 107 notes one or more identifying properties 113 of the connecting endpoints 103. In one embodiment, the identifying properties 113 can be in the form of the MAC address of a connecting endpoint 103, but can also or instead include other "fingerprint" properties, such as software or hardware identifiers. When an endpoint 103 connects to the WAP 105 for the first time (as all endpoints 103 do to initially join a wireless network 101), identifying properties 113 (e.g., MAC address) concerning the endpoint 103 are added to the managed endpoints list 109. In some embodiments, the managed endpoints list can be manipulated as desired. For example, a parent or network manager with sufficient privileges could add or delete endpoints 103 from the managed endpoints list 109. As another example, the endpoint identification component 107 could automatically ignore endpoints 103 with certain identifying properties 113.

With the use of the endpoint identification component 107 as described above, parents and/or network managers do not need to determine MAC addresses or other identifying properties 113 of endpoints 103 to be managed, add this information to a list, or convey this information to an endpoint management system 111. Instead, the endpoint identification component 107 automatically detects any endpoint 103 joining the wireless network 105, and automatically flags detected endpoints 103 as controlled devices. Individual identified endpoints 103 to be managed and/or the managed endpoint list 109 can be automatically provided to an endpoint management system 111, which can apply control policy to managed endpoints 103 as desired. It is to be understood that an endpoint management system 111 simply refers to any technology which enables preventing specific endpoints 103 from joining non-approved wireless networks 101.

Figure 2:
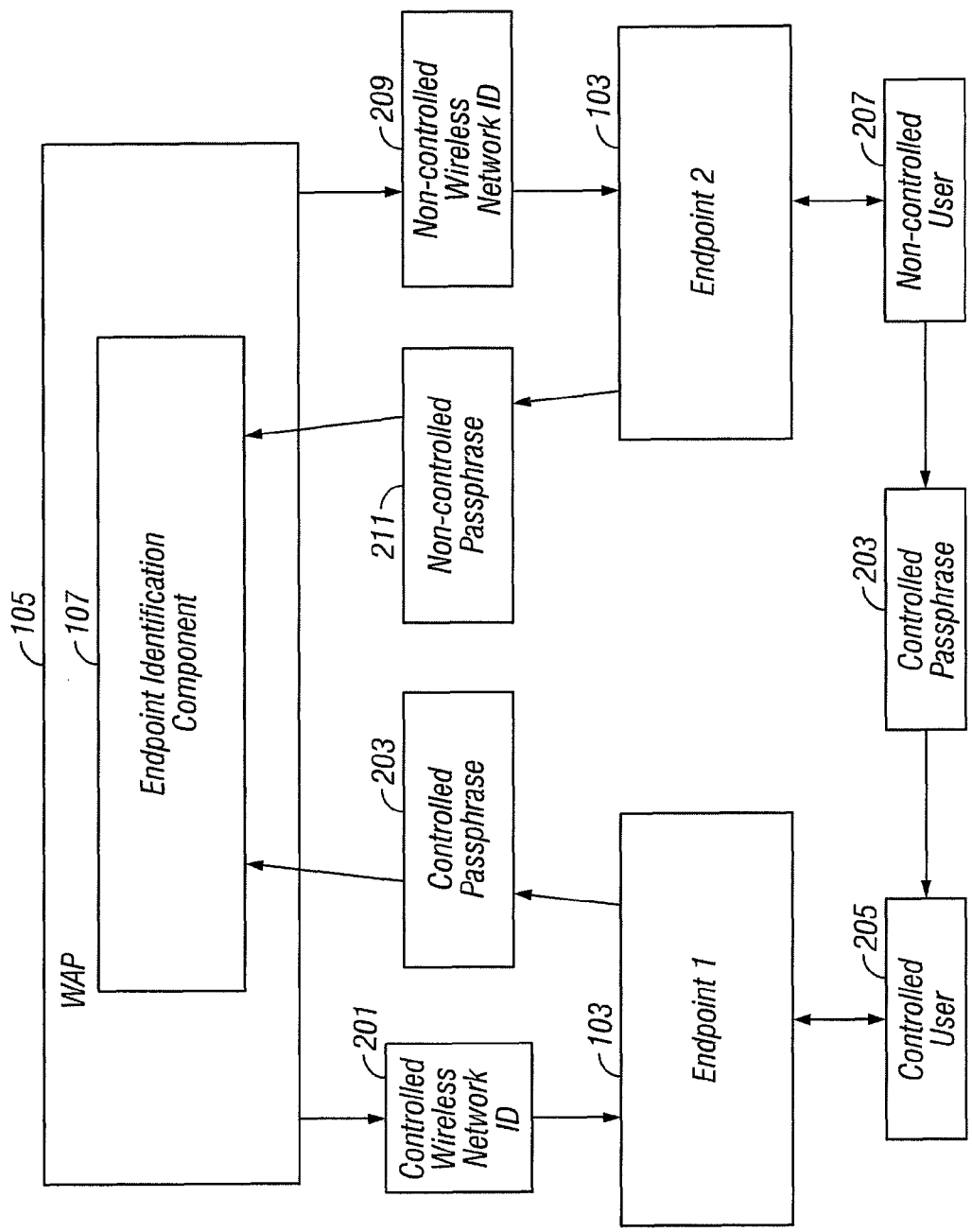
FIG. 2 is a block diagram illustrating a method for automatically identifying wireless endpoints to be secured, according to another embodiment of the present invention.

FIG. 2 illustrates another embodiment, in which the WAP 105 provides a controlled wireless network identifier 201 (e.g., a Service Set Identifier (SSID) under the 802.11 wireless network protocol) that is associated with a specific, controlled passphrase 203 for use by endpoints 103 to be controlled (e.g., endpoints 103 used by controlled users 205, such as children or employees). A separate, non-controlled wireless network identifier 209 and associated non-controlled passphrase 211 is used to access the wireless network 101 by non-controlled users 207 (e.g., parents, network administrators, etc.).

In this scenario, the parent or network administrator provides only the controlled passphrase 203 to controlled users 205, who then join the wireless network 101 using that passphrase 203. The use of the controlled passphrase 203 is detected by the endpoint identification component 107, which identifies the endpoint 103 being used by the controlled user 205, and adds its MAC address (or other identifying properties 113) to the managed endpoints list 109. On the other hand, access to the wireless network 101 by non-controlled users 207 utilizing the non-controlled passphrase 211 does not trigger this special processing by the endpoint identification component 107.

In one embodiment, there are separate specific wireless network identifier passphrase pairs for controlled users 205 and non-controlled users 207, each of which is used by its respective users 205, 207 for all access to the wireless network 101. In another embodiment, the separate specific wireless network identifier passphrase pairs are used by controlled users 205 and non-controlled users 207 respectively to initially join the wireless network 101, but single non-controlled wireless network identifier passphrase pair is utilized by all users 205, 207 for subsequent wireless network 101 access. This single wireless network identifier passphrase pair can but need not be the same one used by non-controlled users 207 for initially joining the wireless network 101.

It is to be understood that the methodology described above is not limited to application in home or business based wireless networks 101. This functionality can be applied in any context in which there is a management relationship between a wireless network 101 and connecting endpoints 103. For example, given the rise in use of wireless technology in more and more devices (e.g., phones, storage devices, laptops, etc.), the resulting management of numerous endpoints 103 can become a scaling problem for enterprises. This functionality can be used in that context to associate such endpoints 103 into a management structure. It is to be understood that although the 802.11 wireless network protocol is used as an example above, the present invention is in no way limited to use with any specific wireless network protocol.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies, data structures and other aspects are not mandatory or significant, and the mechanisms that implement the invention or its features may have different names, divisions and/or formats. Furthermore, as will be apparent to one of ordinary skill in the relevant art, the portions, modules, agents, managers, components, functions, procedures, actions, layers, features, attributes, methodologies, data structures and other aspects of the invention can be implemented as software, hardware, firmware or any combination of the three. Wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming. Additionally, the present invention is in no way limited to implementation in any specific programming language, or for any specific operating system or environment. Furthermore, it will be readily apparent to those of ordinary skill in the relevant art that where the present invention is implemented in whole or in part in software, the software components thereof can be stored on computer readable storage media as computer program products. Any form of tangible computer readable storage medium can be used in this context, such as magnetic or optical storage media. As used herein, the term "computer readable storage medium" does not mean an electrical signal separate from an underlying physical medium. Additionally, software portions of the present invention can be instantiated (for example as object code or executable images) within the memory of any computing device. Accordingly, the disclosure of the present invention is intended to be illustrative, but not limiting, of the scope of the invention, which is set forth in the following claims.

What is claimed is:

1. A method for automatically identifying wireless endpoints to be secured in a wireless network context, the method comprising the steps of:

detecting wireless endpoints connecting to a wireless access point;

determining that at least one detected endpoint is connecting to the wireless access point to join a wireless network;

for at least one endpoint determined to be connecting to the wireless access point to join a wireless network, automatically identifying that at least one endpoint as an endpoint to be managed as authorized, but with network controls, comprising:

providing a controlled SSID (service set identifier) for selecting a wireless access point and a controlled passphrase pair for successfully accessing a wireless network by controlled users, and a non-controlled SSID and a non-controlled passphrase pair for successfully accessing a wireless network by non-controlled users;

for at least one endpoint determined to be connecting to the wireless access point to join a wireless network, determining that the at least one endpoint is using the controlled SSID and controlled passphrase pair;

responsive to determining that the at least one endpoint is using the controlled SSID and controlled passphrase pair, automatically identifying that at least one endpoint as an endpoint to be managed;

for at least one endpoint determined to be connecting to the wireless access point to join a wireless network, determining that the at least one endpoint is using the non-controlled SSID and non-controlled passphrase pair; and responsive to determining that the at least one endpoint is using the non-controlled SSID and non-controlled passphrase pair, automatically identifying the at least one endpoint as an endpoint not to be managed; and automatically identifying at least one identified endpoint, as determined by the controlled SSID and controlled passphrase pair, to be managed to an endpoint management system.

2. The method of claim 1 further comprising:

automatically adding at least one identified endpoint to be managed to a managed endpoints list; and automatically providing the managed endpoints list to an endpoint management system.

3. The method of claim 2 further comprising further comprising:

receiving at least one request to modify the managed endpoints list from an authorized party; and responsive to receiving the at least one request, modifying the managed endpoints list accordingly.

4. The method of claim 1 further comprising:

for at least one endpoint determined to be connecting to the wireless access point to join a wireless network, gleaning at least one identifying property concerning that at least one endpoint; and automatically providing the least one identifying property concerning that at least one endpoint to an endpoint management system.

5. The method of claim 4 wherein gleaning at least one identifying property concerning an endpoint further comprises performing at least one step from a group of steps consisting of:

determining a MAC address concerning an endpoint;

determining at least one software identifier concerning an endpoint; and determining at least one hardware identifier concerning an endpoint.

6. The method of claim 4 further comprising:

automatically adding at least one identifying property concerning at least one identified endpoint to be managed to a managed endpoints list; and automatically providing the managed endpoints list to an endpoint management system.

7. The method of claim 4 further comprising:

ignoring at least one endpoint determined to be connecting to the wireless access point to join a wireless network, responsive to the at least one endpoint possessing at least one specific identifying property.

8. The method of claim 1 further comprising:

providing at least one controlled wireless network identifier and passphrase pair for joining a wireless network by controlled users, at least one non-controlled wireless network identifier and passphrase pair for joining a wireless network by non-controlled users, and at least one wireless network identifier and passphrase pair for post-joining access to a wireless network by controlled and non-controlled users;

for at least one endpoint detected connecting to the wireless access point, determining that the at least one endpoint is using an wireless network identifier and passphrase pair for post-joining access to a wireless network by controlled and non-controlled users; and responsive to determining that the at least one endpoint is using an wireless network identifier and passphrase pair for post-joining access to a wireless network by controlled and non-controlled users, determining that the at least one endpoint is not connecting to the wireless access point to join a wireless network.

9. The method of claim 1 wherein determining that at least one detected endpoint is connecting to the wireless access point to join a wireless network further comprises:

determining that the at least one detected endpoint is connecting to the wireless access point for the first time.

10. At least one non-transitory computer readable storage medium storing a computer program product for automatically identifying wireless endpoints to be secured in a wireless network context, the computer program product comprising:

program code for detecting wireless endpoints connecting to a wireless access point;

program code for determining that at least one detected endpoint is connecting to the wireless access point to join a wireless network;

program code for, for at least one endpoint determined to be connecting to the wireless access point to join a wireless network, automatically identifying that at least one endpoint as an endpoint to be managed as authorized, but with network controls, comprising:

program code for, providing a controlled SSID (service set identifier) to select a wireless access point and a controlled passphrase pair for successfully accessing a wireless network by controlled users, and a non-controlled SSID and non-controlled passphrase pair for successfully accessing a wireless network by non-controlled users;

program code for, for at least one endpoint determined to be connecting to the wireless access point to join a wireless network, determining that the at least one endpoint is using the controlled SSID and controlled passphrase pair;

program code for, responsive to determining that the at least one endpoint is using the controlled SSID and controlled passphrase pair, automatically identifying that at least one endpoint as an endpoint to be managed;

program code for, for at least one endpoint determined to be connecting to the wireless access point to join a wireless network, determining that the at least one endpoint is using the non-controlled SSID and non-controlled passphrase pair; and program code for, responsive to determining that the at least one endpoint is using the non-controlled SSID and non-controlled passphrase pair, automatically identifying the at least one endpoint as an endpoint not to be managed; and program code for, automatically identifying at least one identified endpoint, as determined by the controlled SSID and the controlled passphrase pair, to be managed to an endpoint management system.

11. The computer program product of claim 10 further comprising:

program code for automatically adding at least one identified endpoint to be managed to a managed endpoints list; and program code for automatically providing the managed endpoints list to an endpoint management system.

12. The computer program product of claim 11 further comprising further comprising:
  program code for receiving at least one request to modify the managed endpoints list from an authorized party; and
  program code for, responsive to receiving the at least one request, modifying the managed endpoints list accordingly.

13. The computer program product of claim 10 further comprising:
  program code for, for at least one endpoint determined to be connecting to the wireless access point to join a wireless network, gleaning at least one identifying property concerning that at least one endpoint; and
  program code for automatically providing the least one identifying property concerning that at least one endpoint to an endpoint management system.

14. The computer program product of claim 13 wherein the program code for gleaning at least one identifying property concerning an endpoint further comprises program code for performing at least one step from a group of steps consisting of:
  determining a MAC address concerning an endpoint;
  determining at least one software identifier concerning an endpoint; and
  determining at least one hardware identifier concerning an endpoint.

15. The computer program product of claim 13 further comprising:
  program code for automatically adding at least one identifying property concerning at least one identified endpoint to be managed to a managed endpoints list; and
  program code for automatically providing the managed endpoints list to an endpoint management system.

16. The computer program product of claim 13 further comprising:
  program code for ignoring at least one endpoint determined to be connecting to the wireless access point to join a wireless network, responsive to the at least one endpoint possessing at least one specific identifying property.

17. The computer program product of claim 10 further comprising:
  program code for providing at least one controlled wireless network identifier and passphrase pair for joining a wireless network by controlled users, at least one non-controlled wireless network identifier and passphrase pair for joining a wireless network by non-controlled users, and at least one wireless network identifier and passphrase pair for post-joining access to a wireless network by controlled and non-controlled users;
  program code for, for at least one endpoint detected connecting to the wireless access point, determining that the at least one endpoint is using an wireless network identifier and passphrase pair for post-joining access to a wireless network by controlled and non-controlled users; and
  program code for, responsive to determining that the at least one endpoint is using an wireless network identifier and passphrase pair for post-joining access to a wireless network by controlled and non-controlled users, determining that the at least one endpoint is not connecting to the wireless access point to join a wireless network.

18. The computer program product of claim 10 wherein the program code for determining that at least one detected endpoint is connecting to the wireless access point to join a wireless network further comprises:
  program code for determining that the at least one detected endpoint is connecting to the wireless access point for the first time.

19. A computer system for automatically identifying wireless endpoints to be secured in a wireless network context, the computer system comprising:
  means for detecting wireless endpoints connecting to a wireless access point;
  means for determining that at least one detected endpoint is connecting to the wireless access point to join a wireless network;
  means for, for at least one endpoint determined to be connecting to the wireless access point to join a wireless network, automatically identifying that at least one endpoint as an endpoint to be managed as authorized, but with network controls, comprising:
  means for providing a controlled SSID (service set identifier) for selecting a wireless access point and a controlled passphrase pair for successfully accessing a wireless network by controlled users, and a non-controlled SSID and a non-controlled passphrase pair for successfully accessing a wireless network by non-controlled users;
  means for, for at least one endpoint determined to be connecting to the wireless access point to join a wireless network, determining that the at least one endpoint is using the controlled SSID and controlled passphrase pair;
  means for, responsive to determining that the at least one endpoint is using the controlled SSID and controlled passphrase pair, automatically identifying that at least one endpoint as an endpoint to be managed;
  means for, for at least one endpoint determined to be connecting to the wireless access point to join a wireless network, determining that the at least one endpoint is using the non-controlled SSID and non-controlled passphrase pair; and
  means for, responsive to determining that the at least one endpoint is using the non-controlled SSID and non-controlled passphrase pair, automatically identifying the at least one endpoint as an endpoint not to be managed; and
  means for, automatically identifying at least one identified endpoint, as determined by the controlled SSID and controlled passphrase pair, to be managed to an endpoint management system.

* * * * *